United States Patent [19]
Adams et al.

[11] Patent Number: 5,436,617
[45] Date of Patent: Jul. 25, 1995

[54] REPEATERS FOR DIGITAL DATA NETWORKS

[75] Inventors: Martin C. Adams, Much Hadham; Dipak M. Soni, London, both of Great Britain

[73] Assignee: 3Com Corporation, Santa Clara, Calif.

[21] Appl. No.: 956,005

[22] PCT Filed: Mar. 30, 1992

[86] PCT No.: PCT/GB92/00569
§ 371 Date: Jan. 29, 1993
§ 102(e) Date: Jan. 29, 1993

[87] PCT Pub. No.: WO92/17963
PCT Pub. Date: Oct. 15, 1992

[30] Foreign Application Priority Data
Apr. 4, 1991 [GB] United Kingdom ............... 9107031

[51] Int. Cl.$^6$ ............ H04Q 9/00; H04Q 11/04; H04L 12/56; H04J 3/24
[52] U.S. Cl. ............ 340/825.4; 340/825.52; 370/60.1; 370/85.13; 370/94.3
[58] Field of Search ............ 340/825.4, 825.07, 825.5, 340/825.52, 825.54, 825.1, 825.02; 370/60.1, 75, 85.3, 94.3, 97, 94.1, 60, 61, 85.13; 375/3; 359/120, 174, 176, 178

[56] References Cited

U.S. PATENT DOCUMENTS

| | | | |
|---|---|---|---|
| 4,191,941 | 3/1980 | Springer et al. | 340/825.1 |
| 4,633,245 | 12/1986 | Blount et al. | 370/60 |
| 4,646,296 | 2/1987 | Bartholet et al. | |
| 4,991,171 | 2/1991 | Teraslinna et al. | 340/825.52 |
| 4,999,833 | 3/1991 | Lee | 370/94.3 |
| 5,095,480 | 3/1992 | Fenner | 340/825.54 |
| 5,107,489 | 4/1992 | Brown et al. | 370/60.1 |
| 5,119,370 | 6/1992 | Terry | 370/60.1 |
| 5,127,067 | 6/1992 | Delcoco et al. | 359/120 |
| 5,136,580 | 8/1992 | Videlock et al. | 370/60 |
| 5,140,585 | 8/1992 | Tomikawa | 370/94.3 |
| 5,144,293 | 9/1992 | Rouse | 340/825.02 |
| 5,144,622 | 9/1992 | Takiyasu et al. | 370/85.13 |
| 5,204,858 | 4/1993 | Kinashi et al. | 370/94.1 |
| 5,309,437 | 5/1994 | Perlman et al. | 340/825.02 |

*Primary Examiner*—Donald J. Yusko
*Assistant Examiner*—Mark H. Rinehart
*Attorney, Agent, or Firm*—Haynes & Davis

[57] ABSTRACT

A multiport repeater for a data network operating on a CSMA or CSMA/CD protocol, for example an Ethernet local area network, has signals transmitted from port to port via a crosspoint switch or other appropriate switching means. The destination address of each incoming data frame is read and compared with a stored table to determine which port or ports the frame needs to be transmitted to, and the switching means is then operated to cease transmitting the frame unnecessarily to other ports. The remaining ports are thus returned to an idle state, and a second frame overlapping with the first can be received and retransmitted provided it does not require any of the ports that are in use in transmitting the first frame. If the second frame does require one of the ports that are already in use, then a collision signal is returned and the source station will stop transmission in the normal way, after which the switching means is reset to respond appropriately when the source station re-tries (or another signal is received).

18 Claims, 4 Drawing Sheets

REPEATERS FOR DIGITAL DATA NETWORKS

BACKGROUND OF THE INVENTION

1. Field of the Invention

This invention relates to multiport repeaters for digital data networks operating on "CSMA" or more especially "CSMA/CD" (carrier sensing multiple access with or without collision detection) protocols, such as the widely-used Ethernet protocol for local area networks. In such networks, individual stations are linked (normally via a "transceiver" or "media access unit" (MAU)) to network hardware that includes at least one "multiport repeater" (MPR) and may also include one or more than one "router" and/or one or more than one "bridge".

The links may be formed by electrical connections through wires or coaxial cables, by optical links through fibres or free space, or in any other appropriate way.

2. Description of Related Art

Data for transmission through such a network is assembled at the source location into digital packets of pre-arranged format. The format includes (among other things) a destination address segment that identifies the station intended to receive the packet and a source address segment identifying the station from which it originated, both of which are normally located near the beginning of the frame. Normally each station is allocated a unique sequence of digits (its "address") which is used to identify it whether in the destination address segment or the source address segment.

In the CSMA/CD protocol, any station that has data ready to transmit will attempt to do so provided it is not currently receiving data from the network, and if a second station begins to transmit in the short interval after the first has begun to transmit but before the second has become aware of it, a "collision" signal is generated and both stations stop transmitting and wait, before trying again, for a length of time that is either randomised or pre-allocated so as to be different for each station, so that repeated collisions between signals from the same two sources are avoided or minimised.

It is in the interest of both the speed and the capacity of the network to minimise the occurrence of data collisions, and in small basic networks data frames are distributed to all stations as rapidly as possible by at least one MPR which (or each of which) regenerates incoming signals and distributes them indiscriminately to all the stations and/or other MPR's that are directly connected to it with a time delay that is only a fraction of the length of a data-frame.

In larger networks, this approach gradually becomes unsatisfactory, as the number of stations seeking access increases and the aggregate time delay through a chain of MPR's also increases, and even in relatively small networks there may be unacceptable security implications in transmitting all the frames to every station. Some networks are therefore divided into sections linked not by MPR's but by "bridges" or "routers". The difference between a bridge and a router is irrelevant to understanding of this invention; each of these stores an incoming frame while it reads at least the destination address and compares it with stored data to determine which part(s) of the network need to receive it. Once this is done, the frame is retransmitted only to that part (or parts) of the network. Bridges and routers are complex and expensive, and they necessarily introduce a delay which will often be substantially longer than a frame length. On the other hand, they increase the capacity of the system by allowing separate control of collisions in the pre-arranged sections of the network and by reducing the overall amount of traffic on some elements of the network.

SUMMARY OF THE INVENTION

The present invention provides an MPR that increases the capacity of a CSMA/CD network for comparatively little extra cost and that operates with no more delay than an ordinary MPR (that is, the multiport repeater executes its repeater function within the time delay established for the repeater by the selected protocol corresponding to the selected local area network (LAN) technology, such as an Ethernet CSMA/CD) and without requiring the division of the network into pre-arranged sections.

The multiport repeater in accordance with the invention comprises (a) a plurality of bidirectional communication ports each for linking the repeater to a station or to another repeater (or other hardware, if required) and (b) regenerators for regenerating incoming signals received on any one of the said ports and outputting the regenerated signal to the other said ports and is characterised by (c) switching means enabling the said regenerated signal to be outputted to all or to less than all of the said other ports and (d) control means with facilities for reading the address segment of each incoming data frame and, by comparison with stored data, identifying some of said other ports as ports to which the address read from the incoming frame does not apply and for operating said switching means for a chosen time interval to cease outputting the said regenerated signal to the ports so identified and to return those ports to a condition in which an incoming signal thereon can be received and regenerated for onward transmission to other of those ports.

Preferably the repeater also includes means for reading the destination segment of a frame received by a port in the condition last referred to, for comparing it with stored data to determine whether it corresponds to another port that is currently in that condition and for outputting a collision signal to the first of these ports if it does not.

Preferably the switching means is a crosspoint switch, or the equivalent, capable of switching signals received at any port independently to each and every one of the other ports.

DETAILED DESCRIPTION

A detailed description of an embodiment of the present invention is described with reference to the figures.

Figure 4:
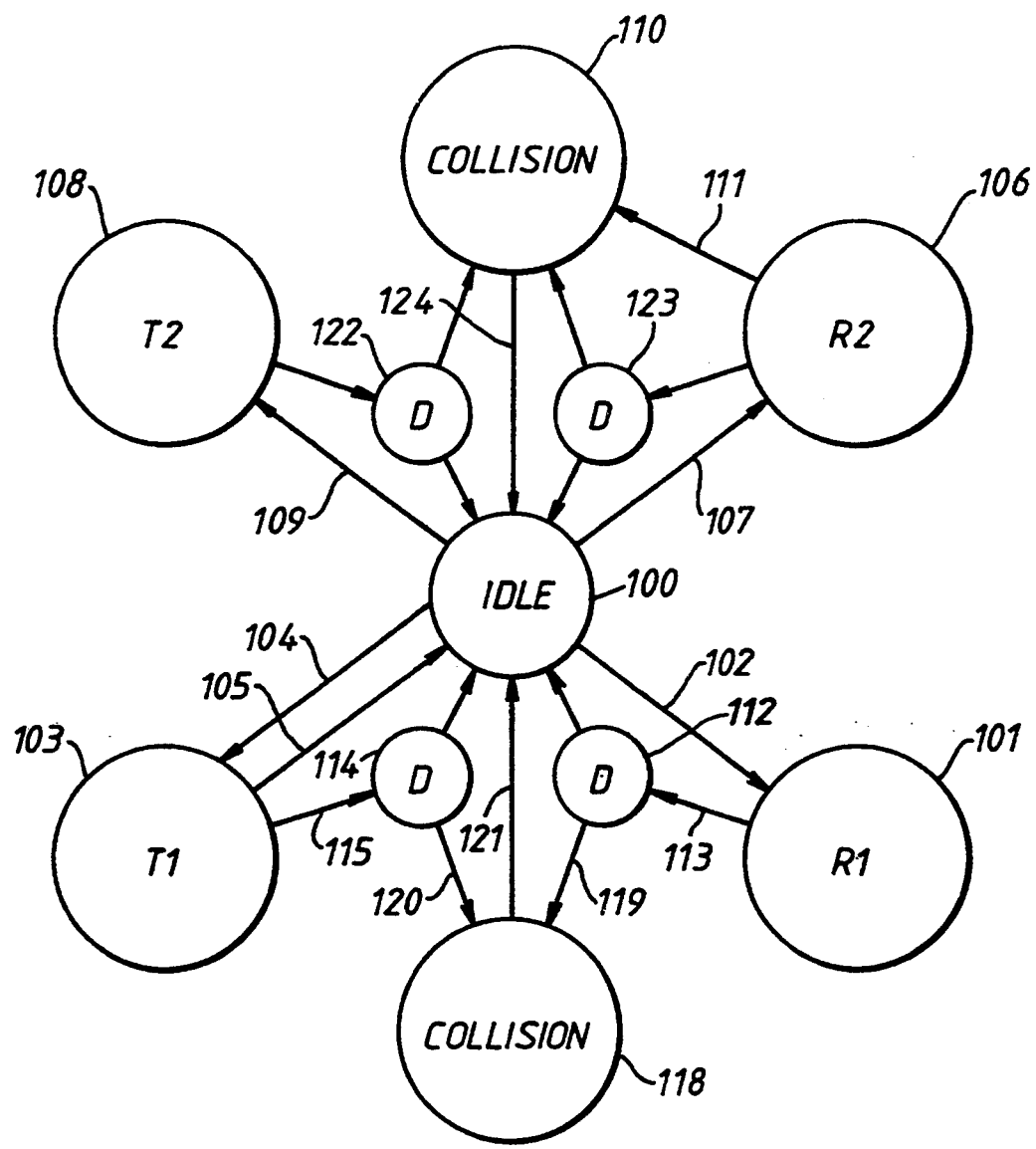
FIG. 4 is a state diagram representative of the operation of the partition facilities of the present invention.

The bidirectional ports (or some of them) may be composite ports constituted by distinct input and output ports. While the existence of other possible strategies is not excluded, the following operating sequences form part of the invention as illustrated with reference to the state diagram of FIG. 4.

First sequence

In the absence of any data signals, all the ports are recorded as "idle" (0) (state 100) and all the switches are closed so that a signal appearing as input on any port of the repeater will be regenerated and initially outputted on all the ports, (one port receiving (R1) (transition to state 101 on line 102) and all others transmitting (T1)(transition to state 103 on line 104)). As the address segment of the data frame is received, it is extracted and looked up in a stored table to identify the port (or ports in the special case of a network with duplicated pathways to provide resilience against breakdown) to which the addressee station is connected, and the switching means is immediately actuated to disconnect all the (T1) ports except the identified one(s) from the (R1) port but to maintain them in connection with each other, restoring them to the (0) state (transition to state 100 on line 105).

If a data frame is now received on one of those ports that has been restored to the (0) state, putting it into a receiving state (R2) (transition to state 106 on line 107), it is regenerated and initially retransmitted to all other ports that were in the (0) state, changing their state to a transmitting state (T2) (transition to state 108 on line 109). Again the address segment is extracted and compared with the stored table, but the essential purpose of the reference is to determine whether the addressee station is on a port that is in the (T2) state or not: if it is not (because it is in the (R1) or (T1) state) the incoming frame cannot be accepted and a collision signal should be applied as rapidly as possible to the (R2) port to stop the originating station transmitting the incoming frame (transition to state 110 on line 111 followed by transition 124 to state 100).

If the addressee station is on a (T2) port, outputting may simply continue to all the (T2) ports, or if desired it may continue only to the port(s) to which the addressee station is connected and the other ports may be disconnected from those ports but connected to each other and returned to the (0) state to allow one or more than one further iteration (optional transition not shown); however, it will be realised that the benefits diminish with each iteration.

When the reception and outputting of a data frame has been completed, the ports concerned may be promptly returned to the idle (0) state, and reconnected by the switching means to any other ports that are currently in that state. However, in many networks there is a high probability that a station that has just transmitted a frame to a particular other station will immediately attempt to send at least one more frame to the same station. Preferably, therefore, there is a time delay before the idle state is restored such that if another frame is received on the same receiving port (say R1) within the normal cycle time of the network it will initially be outputted only to the same transmitting port(s) (T1) as before (transitions to state 112 on line 113 and to state 114 on line 115, followed after delay by transitions to state 100 on lines 116 and 117); the address segment is read and compared and if it again corresponds to the same (T1) port(s), no action is needed; otherwise a collision signal needs to be returned (transition to state 118 on lines 119 and 120) to the receiving (R1) port and the receive and transmit ports returned immediately to the idle state (0) so that if possible the required connection will exist when the originating station re-tries, (transition to state 100 on line 121). States 122 and 123 operate as do states 112 and 114, or may be omitted.

Second Sequence

In networks in which the probability of a succession of frames being transmitted from one source station to one destination station is high, it may be a useful alternative to operate the switching means to cease outputting the regenerated signal only when outputting of one frame has been completed (transition 105 delayed until complete frame received).

This has the advantage that the switching operation creates no "fragments" (incomplete frames), but the minor disadvantage is that single frames and the first frame of each succession will be transmitted every station (except any that was not connected to an "idle" port immediately before the frame began to be received).

In this case it will generally be appropriate to apply a time delay between the end of a frame and the switching operation to restore the idle state.

The multiport repeater may be pre-programmed with the required table relating station numbers (destination addresses) with its port numbers, or it may be programmed to "self-learn" and maintain its own table by reading the source address of each incoming frame and to enter it, with the number of the port on which the signal was received, in its table if it is not already included. Particularly (but not only) in a self-learning repeater so programmed, a frame addressed to a station not listed in the stored table should be transmitted to all available ports, or ideally to all of the ports-the latter will require the use of collision signals unless and until all ports are in the idle (0) condition.

Figure 1:
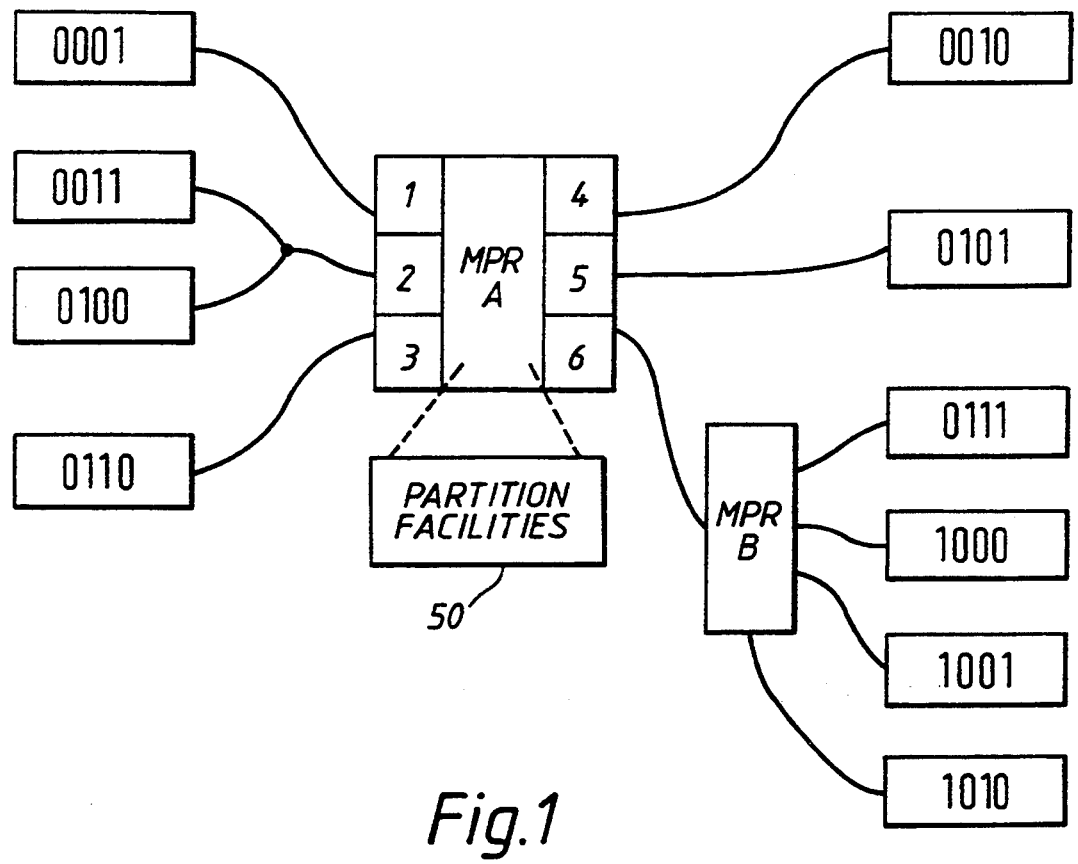
FIG. 1 is an illustration of the context in which a multiport repeater, including partition facilities according to the present invention is applied.
Figure 2:
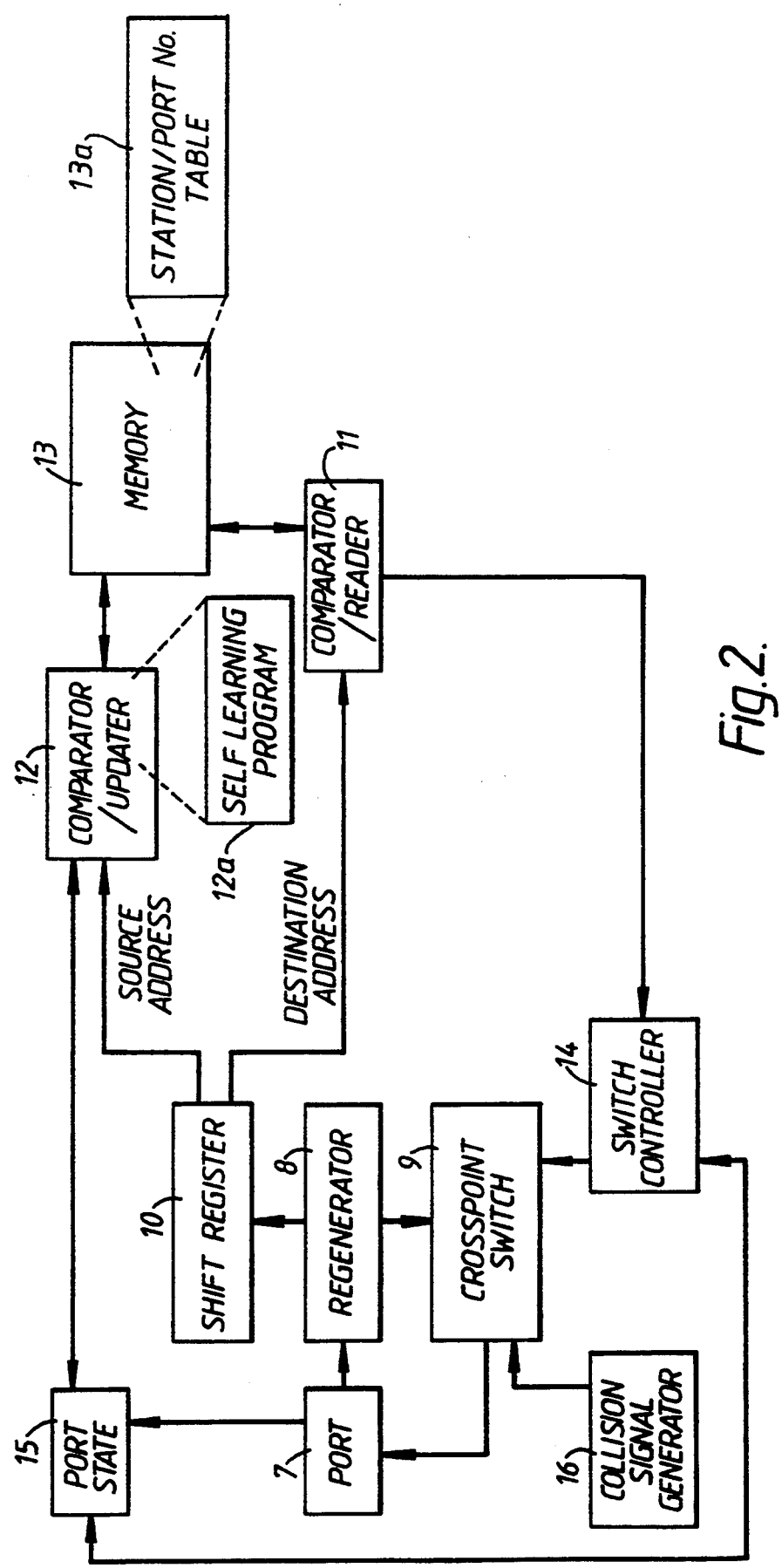
FIG. 2 is a simplified block diagram of the partition facilities in a multiport repeater, according to the present invention.
Figure 3:
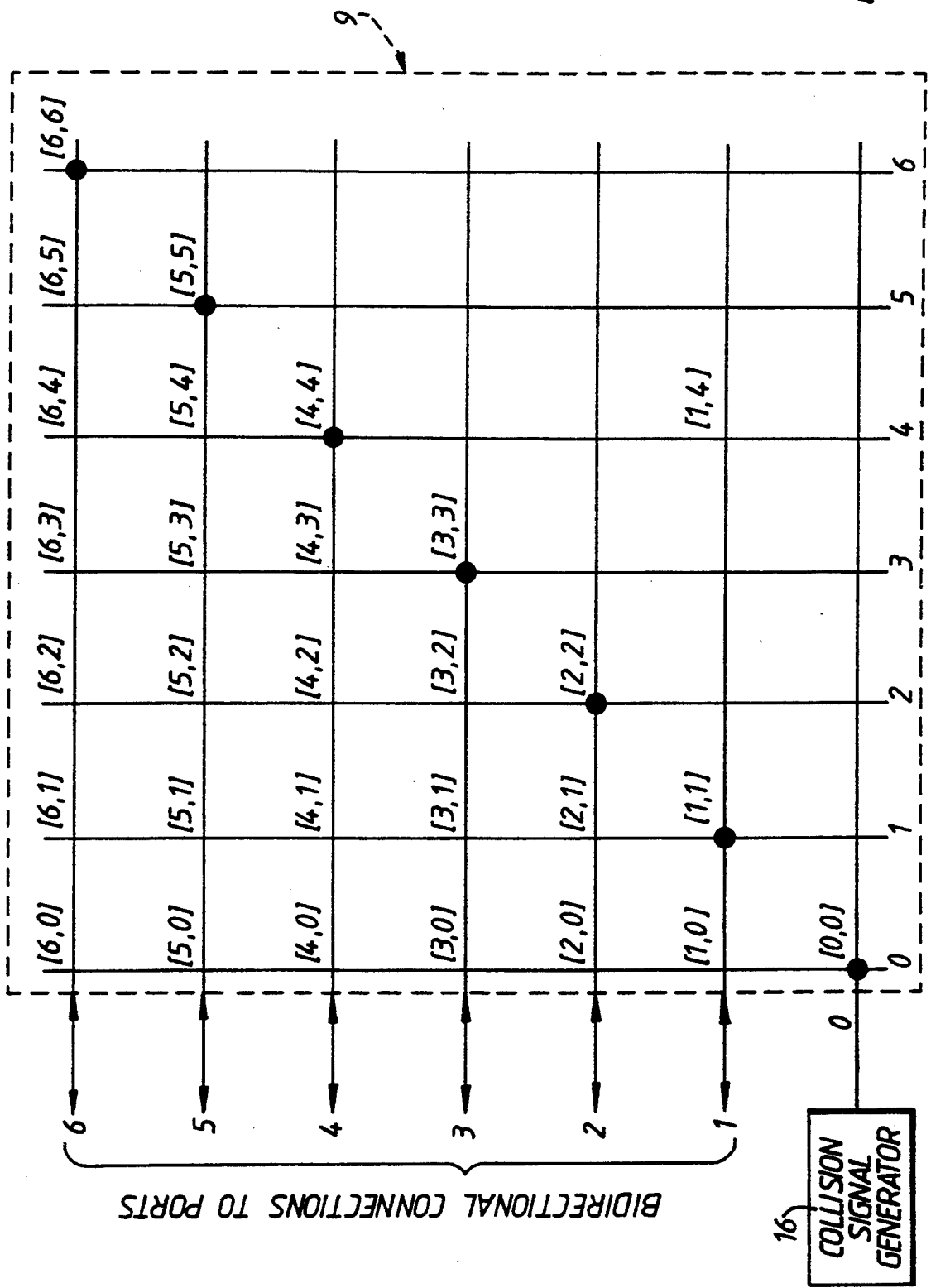
FIG. 3 illustrates a crosspoint switch configuration for use in the system of FIG. 2.

The invention will be further described, by way of example, with reference to the accompanying drawings in which FIG. 1 is a topology diagram of a small local area network including at least multiport repeater in accordance with the invention;

FIG. 2 is a simplified functional diagram of a multiport repeater in accordance with the invention; and FIG. 3 is a diagramatic representation of a crosspoint switch forming part of the multiport repeater of FIG. 2.

Referring first to FIG. 1, the network shown for the purpose of illustration comprises two multiport repeaters, MPR-A which is a repeater in accordance with the present invention including partition facilities 50 and MPR-B which can be another multiport repeater in accordance with the invention or can be an entirely conventional multiport repeater. MPR-A has six ports 1 to 6, of which port 6 is connected to MPR-B; the network also includes terminal stations distinguished by the binary numbers 0001 to 1010 of which numbers 0001 to 0101 are connected to various ports of MPR-A as indicated and the remainder to ports of MPR-B.

Figure 1A:
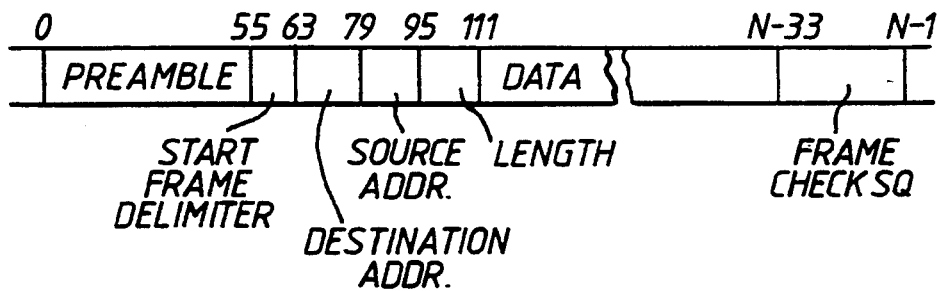
FIG. 1A is an illustration of the format of a typical data packet such as might be used in the system according to FIG. 1.

FIG. 1A illustrates a typical frame format such as might be used in the environment shown in FIG. 1. This frame format includes a preamble constituting the first 7 bytes of the frame, followed then by a start frame delimiter, followed by a destination address of 2 to 6 bytes, followed by a source address of 2 to 6 bytes, followed by a length field, followed by the data in the frame, and ending with a frame check sequence of 4 bytes. This format, for instance, is the standard Ethernet frame format specified by IEEE standard 802.3.

The multiport repeater selected to illustrate the invention is a self-learning one, and on initial start up the operation of the network is entirely conventional with the first incoming dataframe being relayed to all stations, except only the one that originated it.

Referring now mainly to FIG. 2, which is simplified inter alia by omitting all repetitions of functional units, the conventional operation of the repeater is served by a signal received on one of the ports 7 being passed through a conventional regenerator circuit 8 and then via a cross-point switch 9 to the remainder of the ports 7 (if preferred, the regenerator could be located downstream of the crosspoint switch).

In parallel to its being fed to the crosspoint switch 9, the regenerated signal is passed to a shift register 10 which extracts from the signal frame its destination address and source address, which are supplied respectively to a comparator/reader 11 and comparator/updater 12 including a self-learning program 12a. Both the comparator reader 11 and the comparator updater 12 have access to memory 13, and the comparator/reader 11 looks for the destination address in the memory 13; at this stage, since there is as yet no data in the memory, it will not find it, and consequently sends no instruction to the switch controller 14 which therefore leaves the crosspoint switch setting such that the signal continues to be transmitted to all of the ports (except the input port).

Meantime, the comparator/updater 12 also compares the source address of the incoming frame with the list in memory 13, and likewise finds that it is not present; it then interrogates a port state memory 15 to identify the port that is in a receiving (R1) state, and thus the port to which the new source address is connected, either directly or indirectly; the comparator/updater 12 writes this information to memory 13.

This process is repeated as other stations transmit respective first frames, and in a relatively short time, memory 13 will build up a complete table 13a of stations as shown in table 1

TABLE 1

| Station No. | Port No. |
| --- | --- |
| 0001 | 1 |
| 0010 | 4 |
| 0011 | 2 |
| 0100 | 2 |
| 0101 | 5 |
| 0110 | 3 |
| 0111 | 6 |
| 1000 | 6 |
| 1001 | 6 |
| 1010 | 6 |

As soon as MPR-A receives a frame that is addressed to a station that has previously transmitted a frame, the comparator/reader 11 will find the destination address it reads in the memory 13 and will then send instructions to the switch controller 14 such that it will maintain the connection between the receiving (R1) port and the port to which the addressee station is connected (T1), as determined from the table in memory 13, but disconnect those ports from all the others (returning the others to the (0) state).

Referring to FIG. 3, the cross-point switch 9 is shown as a standard 7×7 crosspoint switch with both rows and columns numbered 0 to 6 and with each row connected to the correspondingly numbered column by permanently closing the constituent switches at cross-points [0, 0], [1, 1] . . . [6, 6] or by equivalent hard wiring. (No other connections are made to the columns). Each of rows 1–6 is connected via a respective regenerator circuit (assumed bidirectional) to the correspondingly numbered port, while row 0 is connected to the collision signal generator 16. Thus the constituent switch at cross-point. [n, m] where n>m and m>0 serves to connect ports nos. n and m to each other, when required; in the absence of action by the switch controller 14, all these fifteen switches are closed. The constituent switch at each cross-point [n, 0] provides the facility to connect the collision signal generator to port no. n; in the absence of action by switch controller 14, these six switches are open. Switches at crosspoints [n, m] where n<m are redundant (e.g. the switch at [1, 4] is put in parallel with that at [4, 1] by the fixed connection at 4, 4) but the use of a standard cross-point switch with simple logic and some redundancy is likely to be preferable to the avoidance of redundancy in the switching means by adoption of more complex logic in the switch controller.

Suppose now that station 0001 transmits a frame intended for station 0110, which has previously transmitted at least one frame and is therefore logged in memory 13 against the port number 3. When the frame begins to appear on port 1, all the switches interconnecting the ports are already closed as just explained, but as soon as the comparator/reader 11 determines from the table in memory 13 that the destination station of the frame is on port 3, it instructs the switch controller 14 to operate the crosspoint switch so as to open the constituent switches at [2,1], [4, 1], [5, 1], [6, 1] and [3, 2] (that is those which connect ports 1 and 3 other than to each other), leaving all the others closed. The remainder of the frame is therefore transmitted only to port 3, and for the remainder of the time taken to receive and retransmit that frame, port 1 is in the state (R1), port 3 in the state (T1) and all the other ports in the state (0).

For the moment, assume that the other stations remain inactive until the frame from station 0001 has been completely transmitted. At the end of the frame, the state of the crosspoint switch is maintained from a short time, in the expectation that station 0001 will immediately send another frame also addressed to station 0110. If it does not transmit another frame within the normal cycle time, then the switch controller 14 automatically resets the crosspoint switch 9 to its initial state. If it does transmit a frame within the cycle time, then it is initially transmitted, in accordance with the existing connections, only to port 3. Meantime its destination address is read by the shift register 10 (FIG. 2) and passed to the comparator/reader 11 which refers to the memory 13 and so determines whether the destination address corresponds to the same port as it instructed the switch controller 14 to route the first frame to. If so, it instructs the switch controller 14 (if necessary) to maintain the existing setting in respect of ports 1 and 3; if not, then the frame is not being transmitted to the station intended to receive it and the comparator/reader 11 instructs the switch controller 14 to close the constituent switch [1, 0] and thereby send a collision signal from generator 16 to station 0001 for long enough to terminate its transmission and then to reset by opening the switch at [1, 0] and closing all the port to port switch units.

Next suppose that, while a frame is being transmitted from port 1 to port 3, station 0010 wishes to transmit a frame to station 0101, and that that station has previously transmitted. Since port 4 is not receiving the frame being transmitted from port 1 to port 3, a collision will not be generated on receipt of a frame on this port, but the frame will initially be retransmitted to all the ports except ports 1 and 3. As before, the incoming signal is passed to a shift register 10 (which depending on the organisation of the multiport repeater may be a different shift register from that which received the first frame, or may be the same one) and its destination address is passed to a comparator/reader 11 as before. This interrogates the memory 13 (which will be common to all the units) and determines that the addressee station is on port 5 to which the signal is being transmitted. At this point, the simpler MPR's in accordance with the invention will take no action, and the frame received on port 4 will continue to be transmitted to ports numbers 2, 5 and 6. If desired however, ports 2 and 6 may be switched out by the comparator/reader sending appropriate instructions to the switch controller, either for improved security or so that a third frame received on one of those ports could be transmitted to the other (or vice versa), even while station 0001 continues to transmit to station 0110 and station 0010 continues to transmit to station 0101.

Next suppose that, while a frame is being transmitted from station 0001 to station 0110 while ports 2, 4, 5 and 6 remain in the (0) state, station 0011 attempts to transmit a frame to station 0001. Initially, the incoming frame will be retransmitted to ports 4, 5 and 6 only, which is futile since the addressee station is not connected to any of those ports. However, the destination address of the frame will, as before, be extracted by a shift register 10 and compared by a comparator/reader 11 with the content of memory 13, whereby the comparator/reader 11 will determine that the destination address corresponds to a port that is not in the (0) state and which cannot therefore be successfully transmitted. The comparator/reader 11 therefore instructs the switch controller 14 to close the element [2, 0] of the crosspoint switch to supply a collision signal to port 2 and thereby in the usual way stop station 0011 from attempting to transmit and then re-sets to restore ports 2, 4, 5 and 6 to the (0) state. Station 0011 will in due course re-try according to the system media access protocol.

Finally suppose that, while all the ports on MPR-A are in the (0) state, station 0111 transmits a signal through MPR-B (assumed to be a conventional multiport repeater) to station 1000, then this frame will also appear on port 6 of MPRA. Initially, it will be repeated to all of ports 1 to 5, but once the destination address has been read by shift register 10 and referred to the table in memory 13 by comparator/reader 11, it will be determined that the addressee station is connected (indirectly, as it happens) to port 6, and comparator/reader 11 will therefore instruct switch controller 14 to operate crosspoint switch 9 by opening the switch elements [6,1], [6,2], [6,3], [6,4] and [6,5], so that MPR-A no longer transmits at all until port 6 has either returned to the idle (0) state and remained in it for a pre-arranged length of time or has received a frame addressed to a station on one of the other ports.

We claim:

1. A multiport repeater for a local area network (LAN) employing a particular LAN technology and protocol, comprising:
    (a) a plurality of bidirectional communication ports for linking the repeater to a station or to another repeater;
    (b) regenerators for regenerating incoming data frames including respective address segments, said incoming data frames received on any one of said ports and for outputting said regenerated data frames within a time delay established by the protocol for the repeater;
    (c) switching means enabling said regenerated data frames to be outputted selectively to all or to less than all of said ports; and
    (d) control means with facilities for reading the address segment of each incoming data frame and for operating said switching means to cease outputting said regenerated data frame to those ports that do not correspond to the address segment of said incoming data frame and to return those ports to a condition in which other incoming data frames thereon can be received and regenerated for output while continuing to output said regenerated data frame to at least one of the ports that corresponds to the address segment of said incoming data frame within the time delay established by the protocol.

2. A multiport repeater as in claim 1 wherein said address segment includes a destination address, and including means for reading said destination address of said incoming data frame received by a first port in said condition, comparing said destination address with stored data to determine whether said destination address corresponds to another port that is currently in said condition and for outputting a collision signal to said first port if it is not.

3. A multiport repeater as in claim 1 in which said switching means comprises a crosspoint switch capable of switching incoming data frames received at any port independently to each and every one of the other ports.

4. A multiport repeater as in claim 1 which is pre-programmed with a table relating stations with ports.

5. A multiport repeater as in claim 1, wherein said address segment includes a source address, and resources programmed to self-learn and maintain a table relating stations with ports by reading said source address of each incoming data frame and entering said source address, with a number identifying the port on which said data frame was received, in the table if it is not already included.

6. A multiport repeater for a local area network (LAN) employing a particular LAN technology and protocol, comprising:
    (a) a plurality of bidirectional communication ports for linking the repeater to a station or to another repeater;
    (b) regenerators for regenerating incoming data frames including respective address segments, which comprise destination addresses, received on any one of said ports and outputting said regenerated data frame within a time delay established by the protocol for the repeater;
    (c) switching means enabling said regenerated data frames to be outputted selectively to all or to less than all of said ports;
    (d) control means with facilities for reading the address segment of each incoming data frame and for operating said switching means to cease outputting said regenerated data frame to those ports that do not correspond to the address segment of said incoming data frame and to return those ports to a condition in which other incoming data frames thereon can be received and regenerated for output while continuing to output said regenerated data frame to at least one of the ports that corresponds to the address segment of said incoming data frame within the time delay established by the protocol; and (e) means for reading the destination addresses of other incoming data frames received by a first pod in said condition, comparing the destination addresses with stored data to determine whether the destination addresses correspond to another pod that is currently in said condition and for outputting a collision signal to the first pod if it is not.

7. A multiport repeater as in claim 6 in which the switching means comprises a crosspoint switch, capable of switching incoming data frames received at any pod independently to each and every one of the other ports.

8. A multiport repeater as in claim 8 which is pre-programmed with a table relating stations with ports.

9. A multiport repeater as in claim 7 which is preprogrammed with a table relating stations with ports.

10. A multiport repeater as in claim 6 wherein the address segments include source addresses and including resources programmed to self-learn and maintain a table relating stations with ports by reading the source address of each incoming data frame and entering the source address, with a number identifying the pod on which the incoming data frame was received, in the table if the source address is not already included.

11. A multiport repeater as in claim 7 wherein the address segments include source addresses and including resources programmed to self-learn and maintain a table relating stations with ports by reading the source address of each incoming data frame and entering the source address, with a number identifying the port on which the incoming data frame was received, in the table if the source address is not already included.

12. For a network communicating data frames having identifiable destination addresses on communication media operating according to a carrier sense multiple access protocol with collision detection (CSMA/CD), an apparatus comprising:

a plurality of ports for connection to communication media of the network;

regeneration circuitry connected to the plurality of ports that regenerates data frames being received in one of the plurality of ports and retransmits regenerated data frames to other ports in the plurality of ports, within a time interval which begins before the data frame has been received completely and consistent with the protocol established for the repeater;

separation resources, coupled to the regeneration circuitry and to the plurality of ports, including, resources which determine, in response to a destination address in a data frame being received on a particular port, which of the other ports to which the data frame being received should be retransmitted, resources which separate the plurality of ports into a first set including the particular port and a port on which the received data frame should be retransmitted, and a second set including at least two other ports in the plurality of ports which may operate independent of the first set during retransmission of the received data frame wherein retransmission occurs within the time interval established by the protocol for the repeater, resources which after retransmission of the received data frame within the first set, remove the separation, and circuitry to disable the regeneration circuitry from retransmitting the data frame being received within the first set to ports within the second set, and to enable the regeneration circuitry to retransmit data frames to ports within the second set which are received within the second set independent of ports within the first set; and collision detection logic which issues a collision signal to a given port within the second set if a data frame is received by such given port having a destination address requiring retransmission on a port within the first set.

13. The apparatus of claim 12, wherein the separation resources include switch circuitry operable to separate the plurality of ports after retransmission of the received data frame has begun.

14. The apparatus of claim 13, wherein the switch circuitry is operable to separate the plurality of ports after retransmission of the received frame is complete.

15. The apparatus of claim 13, wherein the switch circuitry is operable to separate the plurality of ports before retransmission of the received frame is complete, such that a fragment of the received data frame may be retransmitted to ports within the second set.

16. The apparatus of claim 12, wherein the time interval within which received data frames are retransmitted begins before the separation resources physically separate the plurality of ports such that at least a fragment of the received data frame is retransmitted within the second set.

17. The apparatus of claim 12, wherein the separation is removed by the separation resources after a specified waiting interval beginning after complete retransmission of the received data frame, if no data frame is received within the first set for retransmission within the first set before expiration of the specified waiting interval.

18. The apparatus of claim 17, wherein the collision detection logic issues a collision signal to a given port within the first set if a data frame is received by such given port during the specified waiting interval having a destination address requiring retransmission on a port within the second set.

* * * * *